United States Patent [19]
Hara et al.

[11] Patent Number: 5,143,275
[45] Date of Patent: Sep. 1, 1992

[54] METHOD FOR REPAIRING A GLASS LAYER OF GLASS-LINED EQUIPMENT

[75] Inventors: Tatsuo Hara, Sumiyoshi-miyamachi; Akihiko Hogetsu, Kobe; Shigeo Uegaki, Fukae-honmachi, all of Japan

[73] Assignee: Shinko Pantec Co., Ltd., Japan

[21] Appl. No.: 790,567

[22] Filed: Nov. 12, 1991

Related U.S. Application Data

[60] Continuation-in-part of Ser. No. 707,621, May 30, 1991, which is a division of Ser. No. 529,935, May 29, 1990, Pat. No. 5,053,251.

Foreign Application Priority Data

Nov. 15, 1990 [JP] Japan .................................. 2-310976

[51] Int. Cl.⁵ .................................................... B23K 31/00
[52] U.S. Cl. ............................... 228/119; 29/402.13; 29/402.18; 65/59.1; 65/59.5; 228/120; 228/175; 228/176; 228/903; 427/327
[58] Field of Search ............... 228/119, 120, 124, 175, 228/176, 182, 903; 29/402.07, 402.13, 402.18; 65/50, 59.1, 59.5; 427/327

[56] References Cited

U.S. PATENT DOCUMENTS

| | | | |
|---|---|---|---|
| 2,531,782 | 11/1950 | Moore | 228/120 |
| 3,523,357 | 8/1970 | Meyer | 228/175 |
| 3,937,617 | 2/1976 | Yaguchi | 228/175 |
| 4,075,364 | 2/1978 | Panzera | 228/120 |
| 4,639,388 | 1/1987 | Ainsworth et al. | 228/120 |

*Primary Examiner*—Samuel M. Heinrich
*Attorney, Agent, or Firm*—Marshall, O'Toole, Gerstein, Murray & Bicknell

[57] ABSTRACT

An improved method for repairing a damaged portion of a glass layer of glass-lined equipment. In the method, a metallic fiber-containing sheet made of a metallic fiber-containing web, a metallic woven fabric sheet or a metallic nonwoven fabric sheet is disposed on the metal substrate of the damaged portion exposed by grinding, and the metallic sheet is welded partially to the metal substrate underlying the glass layer by a resistance or spot weld. After solidification of the repairing agent, e.g., of a sol-gel solution containing a metallic alkoxide which has been applied onto the partially welded sheet(s) and the sol-gel solution impregnated therein, the reapiring glass layer is formed integrally together with the sheet(s) by heating the damaged portion at a temperature from about 300° to about 350° to avoid the occurence of cracks on the glass layer surrounding the damaged portion. A series of the above-mentioned glass forming procedures are repeated until a satisfactory thickness of the reapairing glass layer is obtained.

16 Claims, 2 Drawing Sheets

METHOD FOR REPAIRING A GLASS LAYER OF GLASS-LINED EQUIPMENT

CROSS REFERENCE TO RELATED APPLICATIONS

This application is a continuation-in-part of application Ser. No. 07/707,621, filed May 30, 1991 which is a divisional of application Ser. No. 07/529,935, filed May 29, 1990, now U.S. Pat. No. 5,053,251.

FIELD OF THE INVENTION

The present invention relates to a method for repairing a damaged portion of a glass layer coated on the inner surfaces of a vessel, e.g., a reactor or a storage tank employed in the chemical or food industries by forming a glass on the damaged portion by a sol-gel process.

BACKGROUND OF THE INVENTION AND PRIOR ART

Conventional methods for repairing the glass-lined equipment referred to:

(a) method for installing the caps and the bolts respectively made of anti-corrosive tantalum metal in a metal substrate of the vessel, and sealing the spaces between a glass layer and the caps or the bolts with Teflon packing (U.S. Pat. No. 2,631,360); and (b) method of applying an anti-corrosive adhesive of an organic resin, such as an epoxy resin, to the damaged portion and solidifying the adhesive.

However, method (a) has difficulty in applying the method to the damaged portion on an area having an intricate surface form or on a widely extended area, and the Teflon packing may cause liquid penetration due to the degradation thereof; and since the heat resistance and the solvent resistance of method (b) are inferior, the application subjects of this method would be restricted.

Another conventional method includes a so called sol-gel process wherein an alcohol and a water solution of an organic metal compound, such as a metal alkoxide which serves as a starting material, are heated for forming a glass by dehydration and condensation reactions. In this sol-gel process, the higher the temperature for heating, the more the dehydration and the condensation reactions are accelerated, to form a more closely bonded glass. Accordingly, the heating procedure has to be carried out at a higher temperature (e.g., 700° C. to 800° C.) for producing a high density glass having no voids.

However, in applying the sol-gel process for repairing a damaged portion of a glass layer of glass-lined equipment, heating temperatures are restricted up to about 300° C. or about 350° C. to avoid the occurrence of cracks on the undamaged glass layer surrounding the damaged portion due to the difference in thermal expansion between the underlying steel substrate and the glass layer. Therefore, said sol-gel repairing method would require a considerable length of repairing time, and because of the shrinkage during the glass forming reaction, an excess thickness of the repairing agent layer in one application would cause a crack or an exfoliation in the repairing glass layer. Further, the glass formed under such low temperature remains porous.

U.S. Pat. No. 5,053,251 discloses a method for forming the repairing glass layer comprising the steps of forming a repairing glass layer with a repairing agent containing filler materials, such as glass powder, for preventing the repairing glass layer from substantial shrinkage during the glass forming reaction; filling the voids occurring between the particles of the filler materials with a repairing agent not containing the filler materials; and repeating said glass forming and void filling procedures. In this method, the heating of the repairing agent is carried out, in a range from about 300° C. to about 350° C. with a local heating device provided with a detachable heater unit being surrounded by a flexible insulating cover, and having magnets for attaching the heating device to the damaged portion. The filler materials used therein enable the repairing method to avoid the shrinkage of said repairing glass layer during the glass forming process, to maintain the characteristics required for the repaired damaged portion, such as anti-corrosion, and to reduce the number of repeated coatings for forming a repairing layer having a satisfactory thickness (e.g., 1 mm or more).

Although the repairing glass layers formed according to the aforementioned method has passed the test conforming to JISR4201 (steel ball dropping test to observe the bonding strength of the glass layer to the iron substrate), the bonding strength thereof is 1/10 or less of the bonding strength of the undamaged glass layer. Further, when the repaired glass-lined vessel is in actual use, surface smoothness of the repairing layer is inferior to that of the undamaged glass layer, and residual material in the vessel tends to adhere to the repairing glass surface. A jet of highly pressurized water used to remove the adhered residuals would exfoliate or damage the repairing glass layer by the physical impact thereof.

To improve the bonding strength of the repairing glass layer to a metal substrate is a primary purpose of the present invention.

SUMMARY OF THE INVENTION

The present invention is directed to an improved method for repairing a damaged portion of a glass layer of glass-lined equipment. In the method, a metallic fiber sheet made of a metallic fiber web, a metallic woven fabric sheet or a metallic nonwoven fabric sheet is disposed on the metal substrate of the damaged portion exposed by grinding, and the metallic sheet is welded partially to the metal substrate underlying the glass layer in dotty (see FIG. 3) or in a linear way by a resistance weld. After solidification of the repairing agent of a sol-gel solution containing a metallic alkoxide which has been applied onto the partially welded sheet(s) and the sol-gel solution impregnated therein, the repairing glass layer is formed integrally together with the sheet(s) by heating the damaged portion at a temperature from about 300° C. to about 350° C. to avoid the occurrence of cracks on the glass layer surrounding the damaged portion. A series of the above-mentioned glass forming procedures are repeated until a satisfactory thickness of the repairing glass layer is obtained.

The method for repairing a glass layer of glass-lined equipment according to the present invention comprises the steps of:

(a) removing a damaged portion of the glass layer of glass-lined equipment, such as by grinding, to expose an underlying metal substrate of the equipment;

(b) securing a metallic fiber-containing sheet, such as by welding, being shaped to suit the damaged portion, made of a metallic fiber-containing web or sheet, such as a metallic woven fabric sheet, or a metallic nonwoven fabric sheet to the metal substrate, such as by resistance welding;

(c) applying a repairing agent of sol-gel composition containing a metallic alkoxide and a filler material to said secured sheet, impregnating the sol-gel composition agent therein for filling spaces between fibers, and solidifying the agent;

(d) heating the sol-gel repairing agent to a temperature that does not cause a damaging tensile stress in the glass layer surrounding the damaged (removed) glass portion due to the difference in thermal expansion between the metal substrate and the glass layer surrounding the damaged portion; and (e) repeating the steps (c) and (d), and filling voids that occur in the formed glass layer with a repairing agent that does not include the filler material(s) to form a repairing glass layer bound integrally together with the metallic fiber-containing sheet.

In accordance with the feature of the present invention, since the metallic fiber-containing sheet is welded directly to the metal substrate underlying the damaged portion of the repairing glass layer, the physical bonding strength of the repairing glass layer to the metal substrate would be remarkably improved.

Further, since the repairing agent applied to impregnate the metallic fiber-containing sheet is able to form a glass through hydrolysis and dehydration-condensation reactions thereof, and simultaneously solidify integrally with the metallic fiber-containing sheet, a repairing glass layer having a higher strength against physical impact would be produced.

The repairing method of the present invention provides the improved bonding strength of a repairing glass layer to a metal substrate and enables an improvement of the service life of repaired glass-lined equipment. Even if the repairing glass layer is damaged by a physical impact, the area of the damaged portion would be restricted to a minimum area and would prevent the repairing glass layer from exfoliating; and re-repairing—can be conducted with ease. Further, this method is useful for repairing a portion of glass-lined metallic equipment having an intricate internal surface form (e.g., a curved portion) as shown in FIG. 2 wherein the conventional tantalum repairing method would not be applicable.

DETAILED DESCRIPTION OF A PREFERRED EMBODIMENT

Figure 1:
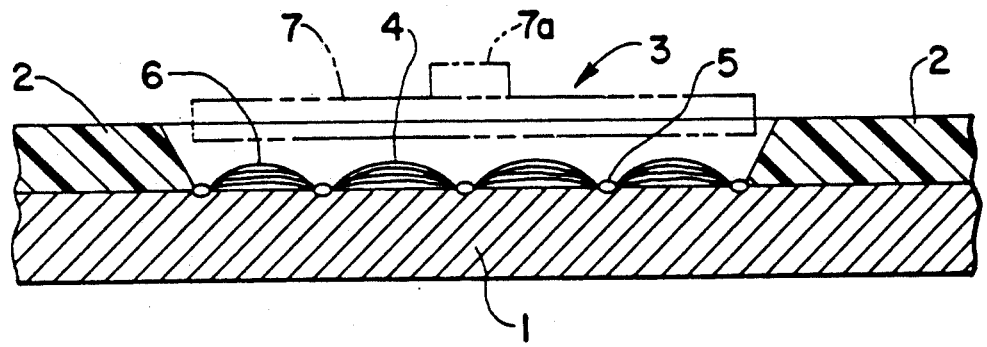
FIG. 1 is an enlarged cross-sectional view of a repairing glass portion being repaired by the method of the present invention.

Examples of a preferred embodiment of the present invention will be described in detail by referring to the drawings attached hereto.

Figure 3:
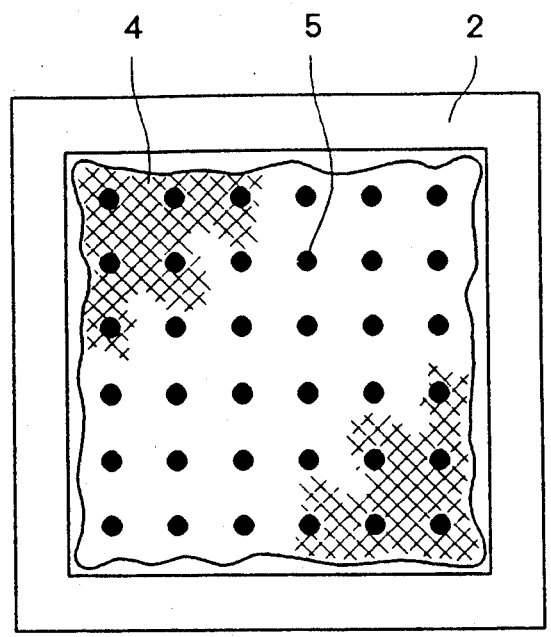
FIG. 3 is a plan view of a metallic fiber-containing sheet spot welded to a damaged portion.

As shown in FIG. 1, in order to repair a damaged portion 3 of a glass layer 2 coated on a metal substrate 1 of glass-lined equipment, the substrate 1 was exposed by grinding off the damaged portion 3 of the layer 2. A metallic fiber-containing sheet 4, being shaped to suit the removed, damaged portion 3 was disposed on the exposed substrate 1, and welded to the substrate 1 by a resistance welding technique. The sheet 4 need not be welded entirely to the substrate 1 but can be spot-welded partially thereto, such as at spaced locations to form a dot matrix of spaced welds, as shown in FIG. 3, or welded along spaced lines. The preferable weld spacing is from about 10 mm to about 15 mm (spacing between welds). Weld spacing less than about 10 mm may prevent sufficient impregnation of the repairing agent into the repair or damaged portion 3 in the repairing steps that follow. The repair portion 3 welded with the sheet 4 is solidified by applying the impregnating a repairing agent of a sol-gel solution thereto, and the solidified repairing agent is heated to form a repairing glass layer 6. These glass forming steps are repeated until a thickness of the layer 6 becomes almost equal to that of the surrounding glass layer 2.

Figure 2:
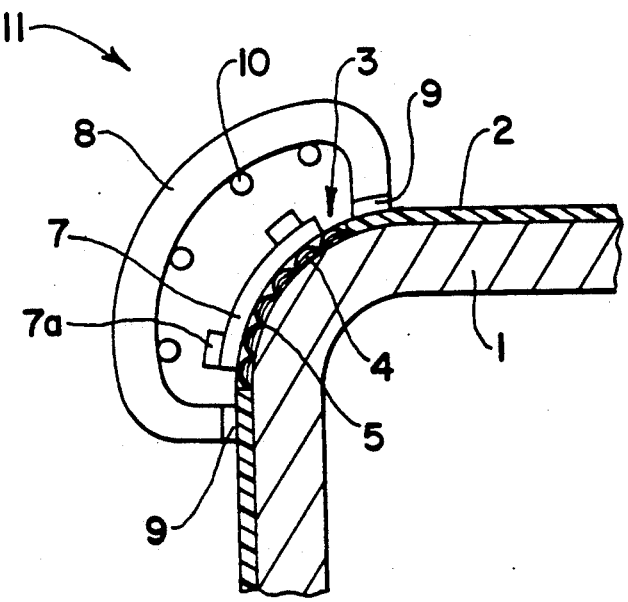
FIG. 2 is a cross-sectional view of a repairing method of the present invention.

After applying and impregnating the repairing agent into the sheet 4, the repairing glass layer was formed by pressing the sheet 4 against the substrate 1 with a plate 7, being shaped to suit the damaged portion, to a repairing glass thickness less than that of the surrounding glass layer 2 to avoid metallic fibers from protruding through the surface of the repairing glass layer; heating the repairing portion at a temperature from about 300° C. to about 350° C. to form the repairing glass layer with a heating device 11 (see FIG. 2) provided with a flexible heat insulator 8 and a heater 10 detachable to the damaged portion with a magnet 9: and finally filling the voids on the surface thereof with a repairing agent not containing the filler material(s).

The preferable repairing agent of sol-gel solution is prepared by mixing the ingredients listed in Table 1, at 25° C. for one hour.

TABLE 1

| Silicon Tetraethoxide | 20 g |
| --- | --- |
| 85% Phosphoric Acid | 1 g |
| Glass Powder or $Al_2O_3$ (Particle Size: 10–100 μm) | 15 g |
| Ethanol | 20 g |
| Water | 20 g |

Since the sheet 4 is welded partially by a resistance welding, e.g. spot-welded, the surrounding glass layer 2 is prevented from cracking due to excessive welding heat. Further, since the spaces between metallic fibers in the metallic fiber-containing sheet 4 and voids between the filler particles are filled with the repairing agent of sol-gel solution, a closed repairing glass layer having fewer voids are formed integrally with the sheet 4 welded to the substrate 1.

EXAMPLE

Example 1

Adhesive Test Of The Repairing Glass Layer

In order to examine the adhesion of the repairing glass layer repaired by the present invention, in accordance with the test conforming to JISR4201 (test to observe the degree of the exfoliation of the glass—covering the metal substrate to be produced—by dropping a 200 g steel ball from the height of 45 cm), a test piece as prepared by coating an SS41 steel plate (6 mm thickness/80 mm square) with a glass layer (1 mm thickness), and forming a damaged portion therein of about 60 mm square which was removed by grinding the damaged glass layer portion to expose the underlying steel substrate.

A metallic fiber sheet 4 (about 5 mm thickness) made entirely of SUS316 stainless steel fibers (about 12 micron diameter) was disposed on the damaged portion, and the sheet 4 was welded to the exposed underlying steel substrate surface by spot welding 5 at a spacing of about 10 mm intervals, as shown in FIG. 3, with a commercially available spot welder.

A repairing agent was prepared by stirring the ingredients constituting a sol-gel solution as listed in Table 2, at 25° C. for one hour.

TABLE 2

| Silicon Tetraethoxide | 20 g |
|---|---|
| 85% Phosphoric Acid | 1 g |
| Ceramic Powder (Particle Size: 10–100 μm) | 15 g |
| Ethanol | 20 g |
| Water | 20 g |

The metallic fiber sheet 4 spot welded to the damaged portion was applied and impregnated with the repairing agent and dried for solidification for 30 minutes at room temperature under the conditions of pressing the sheet 4 toward the substrate by disposing a plate 7 (55 mm square) made of a mirror finished SUS316 stainless steel and fixing the plate 7 thereon with one or more magnets 7a. After solidification, the repairing agent was vitrified by heating at about 350° C. for 10 minutes and was solidified together with said sheet 4 to form a repairing glass layer 6 (about 1 mm thickness).

Although the sol-gel glass provides strong adhesion with the substrate 1 by forming an iron phosphate due to the reaction between the sol-gel glass and iron, the plate 7 and the repairing agent would not adhere to each other because the sol-gel glass does not react with the stainless steel.

Since the glass layer 6 still has voids therein at this stage, after removal of the pressing plate, the repairing glass layer of this Example was surface finished by filling the voids with the repairing agent of Table 2 containing no ceramic powder, after having repeated the repairing process comprising the steps of applying said repairing agent to the damaged portion, impregnating the agent therein, drying the agent, and heating the agent at 350° C. for 10 minutes until the thickness of the repairing glass is almost the thickness of the surrounding glass layer 2.

EXAMPLE 2

Preparation Of Comparative Repairing Glass Layer

A comparative repairing glass layer not incorporating the sheet 4 was prepared according to the method of Example 1.

EXAMPLE 3

Comparative Adhesive Test of The Repairing Glass Layer

A comparative test on the adhesion of the repairing glass layer was carried out conforming to JISR4201 using the repairing glass layer of the present invention and the comparative glass layer of Example 2. The results of the test are as follows:

TABLE 3

| Minimum Height (cm) To Exfoliate The Repairing Glass Layer By 200 g Steel Ball Dropping Test | |
|---|---|
| Comparison | 100* |

TABLE 3-continued

| Minimum Height (cm) To Exfoliate The Repairing Glass Layer By 200 g Steel Ball Dropping Test | |
|---|---|
| Present Invention | 500** |

*Ball Dropping Test from the height of less than 1 m caused no damage on the dropping spot. Ball Dropping Test from the height of 1 m or more caused a large exfoliation of the repairing glass layer.

**Ball Dropping Test from the height of less than 5 m caused no damage on the dropping spot. Ball Dropping Test from the height of 5 m or more caused a small damage on the dropping spot without any propagation such as large exfoliation of the repairing glass layer.

EXAMPLE 4

Comparative Impact Test Of The Repairing Glass Layer (Part 1)

An impact test was conducted to determine if any damage would result to a repairing glass layer from impact of a high-pressure water jet (pressure: 130 kg/cm$^2$; nozzle diameter: 2 mm; distance between the nozzle and the sample: 1 mm; operation time: one minute), the results of the impact resulting from the above-identified water jet on the repairing glass layer of the present invention and that of the comparative glass layer used in the Example 3 were examined respectively.

The comparative glass layer thus impacted had fallen off from the substrate in wide area. In contrast thereto, the repairing glass layer of the present invention was only damaged in a very small area corresponding to the water-impacted spot, without enlarging the exfoliation of the repairing glass layer.

EXAMPLE 5

Comparative Impact Test Of The Repairing Glass Layer (Part 2)

Figure 4:
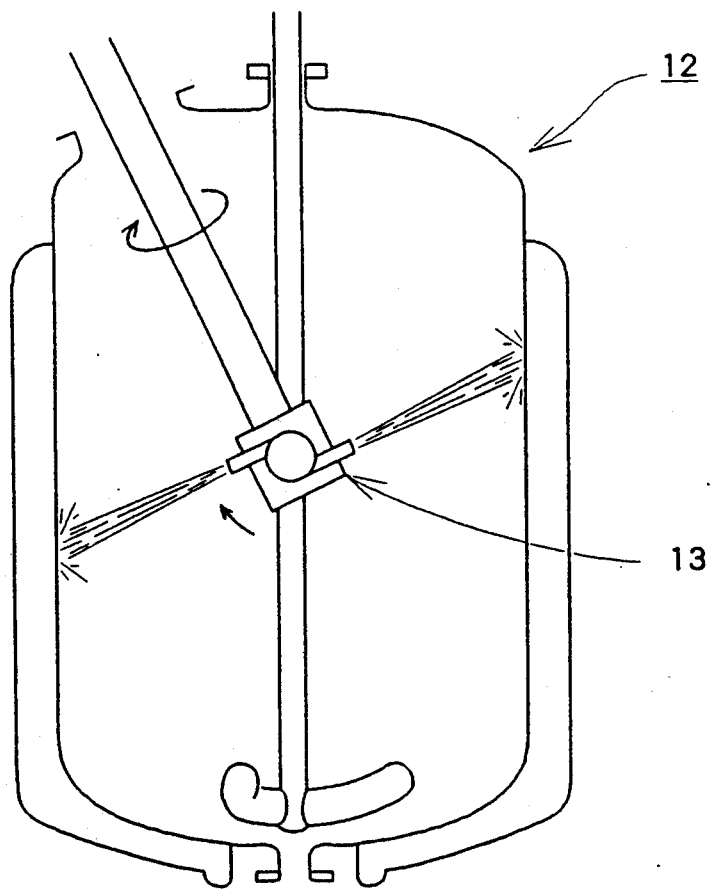
FIG. 4 is a schematic view of a cleaning test on a repaired portion according to the present invention.

Another high-pressure water jet test was conducted (pressure: 200 kg/cm$^2$) from a swivel jet cleaner 13 installed within the center of the glass lined reactor 12 (2.5 m I.D. × 4 m Height) as shown in FIG. 4, the results of the impact resulting from the above-described swivel jet cleaner on the repairing glass layer of the present invention and that of the comparative glass layer, as used in Example 3, both of which were formed on the inner wall of the reactor 12, were examined respectively.

A one hour test caused an exfoliation on the comparative glass layer. On the other hand, no exfoliation on the repaired damaged portion of the present invention was found after an eight hour test.

What is claimed is:

1. A method for repairing a glass layer of glass-lined equipment comprising the steps of:
    (a) removing a damaged portion of the glass layer of the glass-lined equipment, to expose a metal substrate thereunder;
    (b) securing a metallic fiber-containing sheet to the exposed metal substrate;
    (c) impregnating the sheet with a glass repairing agent;
    (d) solidifying the repairing agent;
    (e) heating the repairing agent at a sufficiently low temperature to prevent damage to a glass layer surrounding the removed, damaged portion due to a difference in thermal expansion between the metal substrate and the glass layer surrounding the removed, damaged portion; and (f) repeating the steps of (c), (d) and (e) until the glass repairing agent is approximately equal in thickness to the glass layer adjacent to the damaged portion.

2. A method according to claim 1, wherein said temperature is in the range from about 300° C. to about 350° C. and said glass repairing agent is a sol-gel solution.

3. A method according to claim 1, wherein said method further comprises the step of solidifying said repairing agent while pressing said sheet toward the substrate with a plate after impregnating said repairing agent into said sheet.

4. A method according to claim 2, wherein said method further comprises the step of solidifying said repairing agent while pressing said sheet toward the substrate with a plate after impregnating said repairing agent into said sheet.

5. A method according to claim 3, wherein said plate is fixed onto said sheet with a magnet during solidification of said repairing agent.

6. A method according to claim 1, wherein the metallic fiber-containing sheet is secured to the metal substrate by welding the sheet to said substrate.

7. A method according to claim 6, wherein the sheet is welded by spot welding the sheet to the substrate at spaced locations.

8. A method according to claim 7, wherein the sheet is spot welded to the substrate at a welding spacing of about 10 to about 15 millimeters to provide sufficient non-welded sheet area for impregnation of the repairing glass into the sheet, prior to solidification of the repairing glass.

9. A method for repairing a glass layer of glass-lined equipment comprising the steps of:
(a) removing a damaged portion of the glass layer of the glass-lined equipment, to expose a metal substrate of the equipment;
(b) securing a metallic fiber-containing sheet, shaped to suit said damaged portion, to the metal substrate;
(c) applying a repairing agent of a sol-gel solution, containing a metallic alkoxide, to said sheet, impregnating the repairing agent into the sheet, and solidifying the repairing agent;
(d) heating the repairing agent at a temperature such that the heating does not cause a damaging tensile stress in a glass layer surrounding the damaged portion due to the difference in thermal expansion between the metal substrate and the glass layer surrounding the damaged portion; and
(e) repeating the steps (c) and (d).

10. A method according to claim 9, wherein said temperature is in the range from about 300° C. to about 350° C.

11. A method according to claim 9, wherein said method further comprises the step of solidifying said repairing agent while pressing said sheet toward the substrate with a plate after impregnating said repairing agent into said sheet.

12. A method according to claim 10, wherein said method further comprises the step of solidifying said repairing agent while pressing said sheet toward the substrate with a plate after impregnating said repairing agent into said sheet.

13. A method according to claim 11, wherein said plate is fixed onto said sheet with a magnet during solidification of said repairing agent.

14. A method according to claim 9, wherein the metallic fiber-containing sheet is secured to the metal substrate by welding the sheet to said substrate.

15. A method according to claim 13, wherein the sheet is welded by spot welding the sheet to the substrate at spaced locations.

16. A method according to claim 15, wherein the sheet is spot welded to the substrate at a welding spacing of about 10 to about 15 millimeters to provide sufficient non-welded sheet area for impregnation of the repairing glass into the sheet, prior to solidification of the repairing glass.

* * * * *

UNITED STATES PATENT AND TRADEMARK OFFICE
CERTIFICATE OF CORRECTION

PATENT NO. : 5,143,275
DATED : September 1, 1992
INVENTOR(S) : TATSUO HARA, ET AL.

It is certified that error appears in the above-indentified patent and that said Letters Patent is hereby corrected as shown below:

Title page, item [57] ABSTRACT, line 13, after "the" delete "reapiring" and substitute therefor -- repairing --;
Title page, item [57] ABSTRACT, line 19, after "the" delete "reapiring" and substitute therefor -- repairing --.

Signed and Sealed this

Twentieth Day of September, 1994

Attest:

BRUCE LEHMAN

*Attesting Officer*    *Commissioner of Patents and Trademarks*